(12) United States Patent
Sugata

(10) Patent No.: US 8,342,830 B2
(45) Date of Patent: Jan. 1, 2013

(54) METAL MOLD FOR TIRE FORMATION, PLUG USED IN VENT HOLE OF THE METAL MOLD FOR TIRE FORMATION, AND TIRE MANUFACTURED USING THE METAL MOLD FOR TIRE FORMATION

(75) Inventor: Michihiro Sugata, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 632 days.

(21) Appl. No.: 12/160,392

(22) PCT Filed: Jan. 24, 2006

(86) PCT No.: PCT/JP2006/300992
§ 371 (c)(1),
(2), (4) Date: Jul. 9, 2008

(87) PCT Pub. No.: WO2007/086095
PCT Pub. Date: Aug. 2, 2007

(65) Prior Publication Data
US 2010/0230019 A1    Sep. 16, 2010

(51) Int. Cl.
*B29C 33/10* (2006.01)
(52) U.S. Cl. .................. 425/28.1; 425/472; 425/812
(58) Field of Classification Search .............. 425/28.1, 425/472, 812; 249/141
See application file for complete search history.

(56) References Cited

U.S. PATENT DOCUMENTS

| | | | | |
|---|---|---|---|---|
| 2,865,052 A | * | 12/1958 | Wilcox | 249/141 |
| 4,081,225 A | * | 3/1978 | Yaita | 249/141 |
| 4,351,789 A | * | 9/1982 | Sidles et al. | 425/28.1 |
| 4,492,554 A | * | 1/1985 | Carter | 425/28.1 |
| 4,795,331 A | * | 1/1989 | Cain et al. | 425/28.1 |
| 5,939,101 A | * | 8/1999 | Green | 425/28.1 |
| 6,827,569 B2 | * | 12/2004 | Wieder | 425/812 |
| 6,871,831 B1 | | 3/2005 | Cuny et al. | |
| 6,923,629 B2 | * | 8/2005 | Ahn et al. | 425/28.1 |
| 7,114,944 B2 | * | 10/2006 | Wolfe et al. | 425/812 |
| 7,125,511 B2 | * | 10/2006 | Serener-Thielmann | 425/28.1 |

FOREIGN PATENT DOCUMENTS

| | | |
|---|---|---|
| JP | A 9-314567 | 12/1997 |
| JP | A 2001-232642 | 8/2001 |
| JP | A 2003-340825 | 12/2003 |
| JP | A 2005-28589 | 2/2005 |
| JP | A 2005-178383 | 7/2005 |

* cited by examiner

Primary Examiner — James Mackey
(74) Attorney, Agent, or Firm — Greer, Burns & Crain, Ltd.

(57) ABSTRACT

A metal mold of improved durability and enhanced ventilation efficiency during vulcanization of a tire, including a plug for a vent hole of the mold and a tire manufactured by using the metal mold. The metal mold is one in which vent holes pass through toward an outer portion of the mold from an inner surface of the mold, and in which a plug body is detachably fitted into each of the vent holes. The plug body is configured by a cylinder and a valve. The cylinder includes a large-diameter head portion at an upper portion of the cylinder, and a tubular cylindrical portion with a ventilation hole formed in the center of the cylinder. The valve is inserted into the ventilation hole of the cylinder with an interstice having a predetermined size interposed therebetween. Through-holes communicating with the interstice are formed on the side surface of the cylinder.

7 Claims, 8 Drawing Sheets

METAL MOLD FOR TIRE FORMATION, PLUG USED IN VENT HOLE OF THE METAL MOLD FOR TIRE FORMATION, AND TIRE MANUFACTURED USING THE METAL MOLD FOR TIRE FORMATION

This application is a U.S. National Phase under 35 U.S.C. §371, of International Application No. PCT/JP2006/300992, filed Jan. 24, 2006.

TECHNICAL FIELD

The present invention relates to a metal mold for tire formation, a plug to be used in a vent hole of the metal mold for tire formation, and a tire manufactured by using the metal mold for tire formation.

The present invention more particularly relates to a metal mold for tire formation which enhances ventilation efficiency during vulcanization of the tire and also enhances the durability of the metal mold, a plug to be used in a vent hole of the metal mold for tire formation, and a tire manufactured by using the metal mold for tire formation.

BACKGROUND ART

In a metal mold for tire formation to be used for a tire vulcanization process, a number of fine ventilation holes, referred to as vent holes, have been formed. The vent holes are formed to vent air remaining between an inner surface of the metal mold and an unvulcanized tire during vulcanization of the tire, and to vent gas generated during vulcanization, to the outside of the metal mold.

A number of the vent holes are usually provided at portions in which air tends to remain in the metal mold, and provided at eight portions or more on the same circumferences of the metal mold corresponding, for example, to a bead ring, a rim cushion, a side portion, and the like. The number of circumferences differs by the shape of tire. Further, a vent hole of the metal mold in the design block which is surrounded by grooves of the tire tread is processed and provided at one portion or more.

However, when a tire is vulcanized using a metal mold provided with a number of vent holes, vulcanized rubber flows into a number of the vent holes, and thus, a number of hair-like protrusions which are a number of protrusions so-called spews are generated on a surface of a product tire.

Because of this, in a tire finishing process after the tire formation, an operation to cut off the above spews is required. There arise problems that the operation not only deteriorates workability and productivity but also worsens working conditions due to a number of scattered scraps of cut off spews, and also causes a difficulty in enhancing the external appearance of the product tire.

Thus, in recent years, there have been requests for a reduction of spew scraps and for an improved environment from the reduction of the spew scraps, and a demand for an improvement in the appearance of a tire. For those reasons, a venting apparatus made not to generate the spews the surface of a tire just after vulcanization, and a metal mold for vulcanization with a valve provided in an air ventilation hole have been proposed (for example, refer to Patent Documents 1 and 2)

However, the venting apparatus or the like causes problems in their durability and in extremely deteriorated ventilation efficiency. This is because impurities generated during the tire vulcanization tend to remain between a tubular cylinder fitted into the vent hole, and a valve fitted into the ventilation hole of this cylinder when the remaining air and gas generated during the vulcanization are vented.

[Patent Document 1] Japanese patent application Kokai publication No. Hei 9-314567
[Patent Document 2] Japanese patent application Kokai publication No. 2001-232642

DISCLOSURE OF INVENTION

Focusing on the problems described above, an object of the present invention is to provide a metal mold for tire formation which enhances ventilation efficiency during vulcanization of the tire and also enhances the durability of the metal mold, a plug to be used in a vent hole of the metal mold for tire formation, and a tire manufactured by using the metal mold for tire formation.

To achieve the above object, the present invention has the following configuration.

That is, an aspect of a metal mold for tire formation of the present invention is that tire during tire vulcanization, characterized by comprising a plug body detachably fitted into each of the vent holes, the plug body including: a cylinder having a tubular cylinder portion provided with a large-diameter head portion on an upper portion thereof and a ventilation hole formed in the center thereof; and a valve inserted into the ventilation hole of the cylinder with a predetermined interstice interposed therebetween; and a through-hole communicating with the interstice is formed in the side face of the cylinder.

In the metal mold for tire formation of the present invention, it is desirable that when t (mm in unit) denote the size of the interstice between the cylinder and the valve, L1 (mm in unit) denote the outer diameter of the large-diameter head portion of the cylinder, and L2 (mm in unit) denote the outer diameter of the cylinder portion of the cylinder, t, L1, and L2 be set to be such that $(L1-L2)/2 > t$.

Further, it is desirable that a fastening bearing surface for the cylinder be formed in each of the vent holes, and that a plurality of through-holes communicating with the ventilation hole be formed in the side face of the cylinder. Furthermore, it is desirable that a slot portion connecting the ventilation hole and the corresponding vent hole be formed in a position, on an outer portion side of the metal mold, of the cylinder fitted into each of the vent holes.

Moreover, a plug which is used in a vent hole of a metal mold for tire formation, and which is detachably fitted into a vent hole of a metal mold for tire formation of the present invention is a tubular cylinder provided with a large-diameter head portion on an upper portion thereof, the cylinder being fitted into the vent hole; and a valve slidably fitted into a ventilation hole formed in the center of the cylinder with a predetermined interstice interposed therebetween, and at least one through-hole communicating with the interstice is formed in the side face of a tubular cylinder portion of the cylinder.

For the plug of the invention, it is desirable that when t (mm in unit) denote the size of the interstice between the cylinder and the valve, L1 (mm in unit) denote the outer diameter of the large-diameter head portion of the cylinder, and L2 (mm in unit) denote the outer diameter of the cylinder portion of the cylinder, t, L1, and L2 be set to be such that $(L1-L2)/2 > t$.

Further, it is desirable that a bearing surface with which the valve come into contact be formed below the through-hole formed on the cylinder, and that a slot portion, communicating with the interstice between the ventilation hole and the cylinder, and the valve, be formed at least one place or more on the side of an outer portion of the metal mold of the tubular portion of the cylinder. Still further, it is desirable that the cylinder be closed at the lower portion of the ventilation hole.

A further aspect of the present invention is that a tire formation using the metal mold for tire formation of the present invention is to be formed by fitting the above plug into a number of the vent holes formed on the metal mold.

With the configuration, the ventilation efficiency during tire vulcanization and the durability can be enhanced.

According to the present invention described above, the ventilation efficiency during tire vulcanization and the durability can be enhanced. In addition, it is possible to form a tire with favorable appearance without generating spews on the tire surface during tire vulcanization.

EXPLANATION OF REFERENCE NUMERALS

1: METAL MOLD, 1a: INNER SURFACE OF METAL MOLD, 2: VENT HOLE, 2a: FASTENING BEARING SURFACE, 2b: CONCAVE PORTION, 2c: STEP PORTION, 2x: SMALL-DIAMETER VENT HOLE, 3: PLUG BODY, 4: CYLINDER, 4a: LARGE-DIAMETER HEAD PORTION, 4b: VENTILATION HOLE, 4c: CYLINDRICAL PORTION, 4d: OPENING PORTION, 4x: BEARING SURFACE, 4y: VENTILATION HOLE, 5: VALVE, 5a: SHAFT PORTION, 6: THROUGH-HOLE, 7: INTERSTICE, 8: SLOT PORTION, t: SIZE OF INTERSTICE, L1: OUTER DIAMETER OF LARGE-DIAMETER HEAD PORTION, L2: OUTER DIAMETER OF CYLINDER PORTION, Q: AIR, W: TIRE

BEST MODE FOR CARRYING OUT THE INVENTION

An embodiment of the present invention will be described below with reference to the accompanying drawings and the like.

Figure 1:
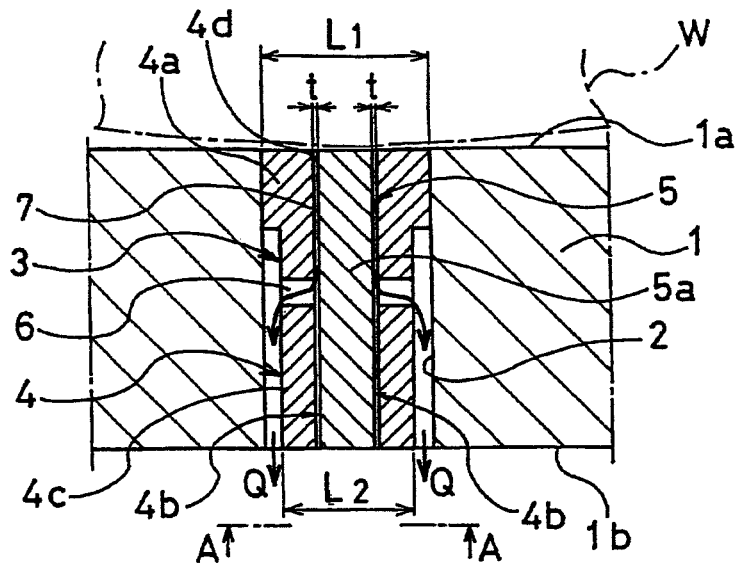
FIG. 1 is a partial enlarged sectional view for explaining a metal mold for tire formation of an embodiment according to the present invention.

FIG. 1 is a partial enlarged sectional view for explaining a metal mold for tire formation of an embodiment according to the present invention. In a metal mold 1, a number of vent holes 2 are formed for venting air and built-up gas Q between the metal mold 1 and a tire W during the tire vulcanization.

Each of the vent holes 2 pass through from an inner surface 1a to an outer surface 1b of the metal mold 1, and a plug body 3 is detachably fitted into each of the vent holes 2.

The plug body 3 is configured by a cylinder 4 and a valve 5. The cylinder 4 includes a large-diameter head portion 4a at an upper portion the cylinder 4, a tubular cylindrical portion 4c with a ventilation hole 4b formed in the center of the cylinder 4. The valve 5 is inserted into the ventilation hole 4b of the cylinder 4 with interstice 7 having a predetermined size t (mm in unit) interposed therebetween. Through-holes 6 communicating with the interstice 7 are formed on the side surface of the cylinder 4. The size t of the interstice 7 is desirably, for example, less than 0.1 mm at which rubber does not flow in, more desirably within the range of 0.05 mm to 0.03 mm, according to the inventors' findings.

Note that, the "large-diameter head portion" is a portion which is at the upper portion of the plug body, and which has a larger diameter than the plug body. Since the large-diameter head portion is placed at the upper portion thereof, it is referred to as a head portion in this invention.

The cylinder 4 is integrally formed of a metal material such as steel, or of a heat-resistant resin material. Further, it is desirable that the valve 5 be integrally formed of, for example, a heat-resistant resin such as polytetrafluoroethylene, or of, for example, a metal material such as steel or stainless.

In a case where t (mm in unit) denotes the size of the interstice 7 between the cylinder 4 and the valve 5, L1 (mm in unit) denotes the outer diameter of the large-diameter head portion of the cylinder 4, and L2 (mm in unit) denotes the outer diameter of the cylinder portion of the cylinder 4 (refer to FIGS. 1 and 10), it is desirable that (L1−L2)/2>t be set. With the above configuration, the circulation of air Q is improved, and thus, the durability is enhanced.

Further, the through-holes 6 are provided at more than one place, the through-holes 6 can be used as bypasses of air ventilation whereby a ventilation distance of the air Q passing through the interstice 7 formed between the cylinder 4 and the valve 5 can be made short.

Figure 2:
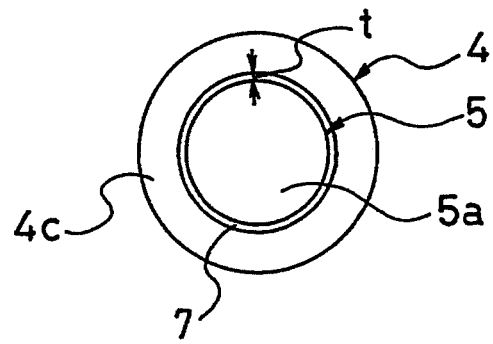
FIG. 2 is a bottom view viewed from an arrow A-A of a cylinder used in the metal mold for tire formation of the embodiment shown in FIG. 1.
Figure 3:
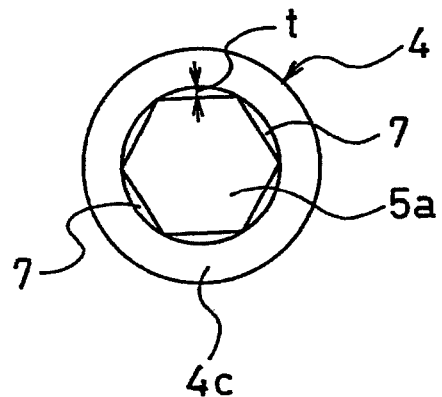
FIG. 3 is a bottom view of another embodiment of the cylinder used in the metal mold for tire formation according to the present invention.

Further, the shape of the shaft portion 5a of the valve 5 is circular as shown in FIG. 2, and in addition, may be polygonal (hexagonal) as shown in FIG. 3. The point is that as long as the interstice 7 with the predetermined size t can be formed between the valve 5 and the inner surface of the cylinder 4, the shape is not particularly limited. Further, it is possible and desirable to form the fastening bearing surface 2a of the cylinder 4 such as one shown in FIG. 7 in the vent hole 2.

Figure 4:
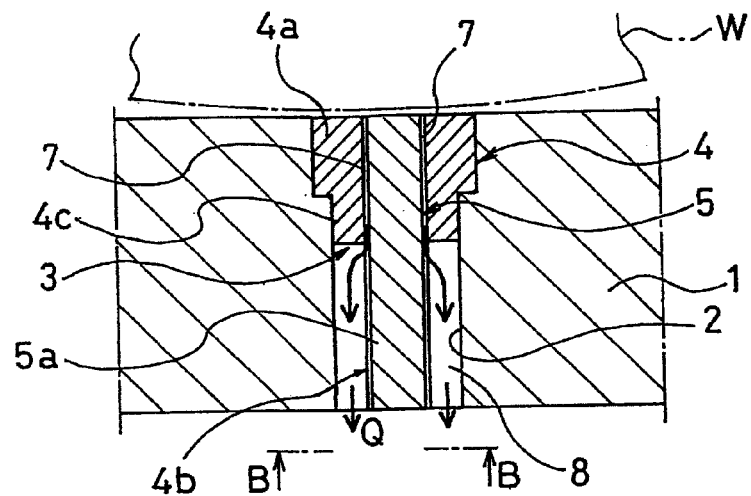
FIG. 4 is a partial enlarged sectional view of the metal mold for tire formation according to the present invention, in which is a cylinder provided with a slot and a valve are detachably fitted into a vent hole.
Figure 5:
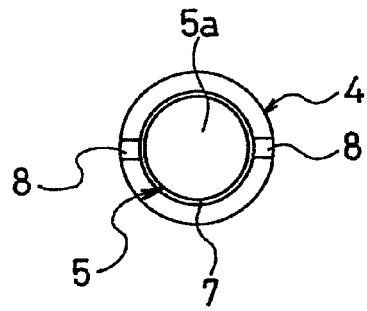
FIG. 5 is a bottom view viewed from an arrow B-B of the cylinder used in the metal mold for tire formation according to the present invention shown in FIG. 4.
Figure 6:
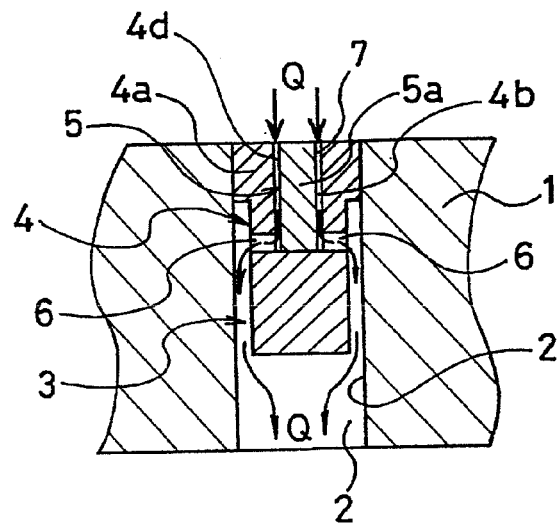
FIG. 6 is a sectional view showing an air venting state where a plug body is being fitted into a vent hole of the metal mold for tire formation according to the present invention.

FIGS. 4 and 5 each show another embodiment of the cylinder 4. In this embodiment, a slot portion 8, connecting the ventilation hole 4b and the vent hole 2, is formed on a portion placed on the side of the outer surface 1b of the metal mold of the cylinder 4 fitted into each of the vent holes. Further, in this embodiment, two slot portions 8 continuous to the ventilation hole 4b are formed with 180 degree symmetric but the number of the slot portions is not limited to two; it is possible to form more than two slot portions 8.

Figure 10:
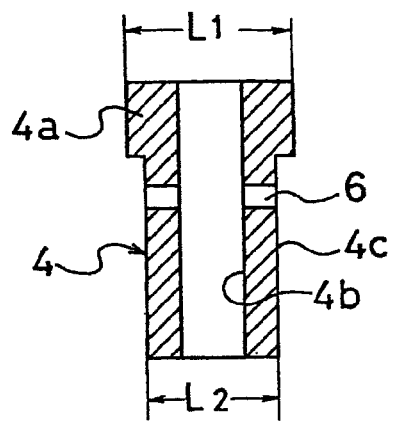
FIG. 10 is a sectional view of a cylinder constituting the plug body according to the present invention.

It is possible to consider various types for embodiments of the cylinder 4 as shown in FIGS. 10 to 21. In FIG. 10, the cylinder 4 is a cylinder, provided with a tubular cylindrical portion 4c with a ventilation hole 4b formed in the cylinder 4 and the large-diameter head portion 4a is formed on the upper portion. A through-hole 6 communicating with the ventilation hole 4b is formed at the cylinder portion 4c near the large-diameter head portion 4a.

Figure 11:
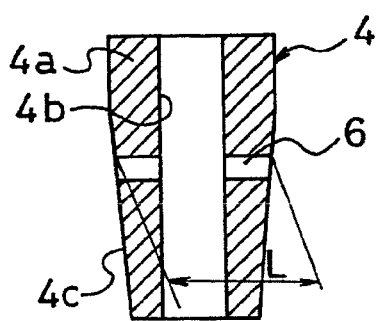
FIG. 11 is a sectional view of another embodiment of the cylinder constituting the plug body according to the present invention.

In FIG. 11, a cylinder portion 4c is formed into a taper shape from a large-diameter head portion 4a of a cylinder 4 toward the edge of a cylinder 4, and a through-hole 6 communicating with a ventilation hole 4b is formed at the cylinder portion 4c near the large-diameter head portion 4a.

Figure 12:
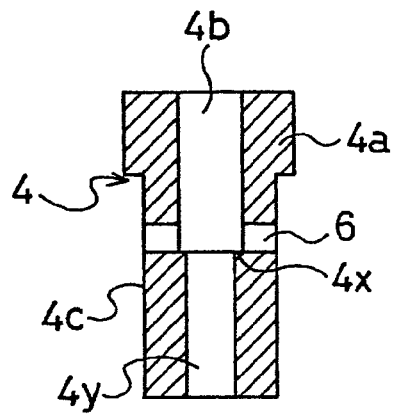
FIG. 12 is a sectional view of another embodiment of the cylinder constituting the plug body according to the present invention.

In FIG. 12, a bearing surface 4x, with which the valve 5 comes into contact, is formed in a ventilation hole 4b of a cylinder 4 provided with a large-diameter head portion 4a; further, a ventilation hole 4y having a small diameter is formed below the bearing surface 4x, and a through-hole 6 communicating with the ventilation hole 4b is formed on the bearing surface 4x.

Figure 13:
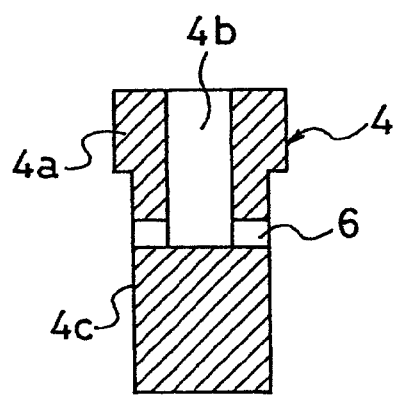
FIG. 13 is a sectional view of a further embodiment of the cylinder constituting the plug body according to the present invention.

Further, FIG. 13 shows a modified example of FIG. 12, in which a ventilation hole 4b of a cylinder 4 is closed in the middle of the cylinder 4, and a through-hole 6 communicating with the ventilation hole 4b is formed to this closed portion.

Figure 14:
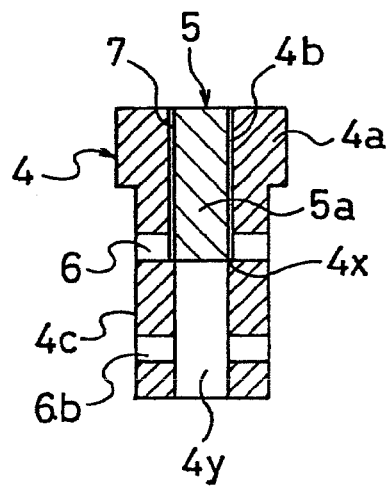
FIG. 14 is a sectional view of a still further embodiment of the cylinder constituting the plug body according to the present invention.

FIG. 14 is a sectional view in which a valve 5 is fitted into the ventilation hole 4b of the cylinder 4 of FIG. 12; in this embodiment, the ventilation hole 4b is formed on a position of the bearing surface 4x of the cylinder 4 of FIG. 12, thus retaining valve 5 (not shown in this Figure) in a stationary position. Also, a through-hole 6b communicating with the ventilation hole 4y is formed to the cylinder portion 4c in which the ventilation hole 4y having a small diameter is formed.

Figure 15:
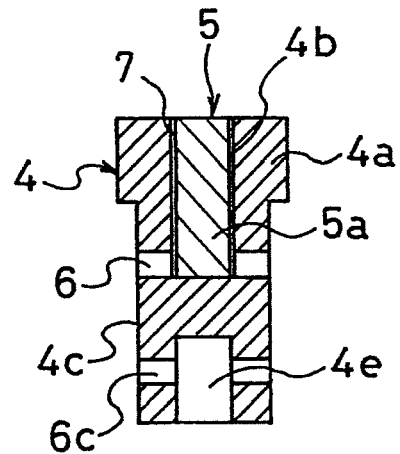
FIG. 15 is a sectional view of a still further embodiment of the cylinder constituting the plug body according to the present invention.

Further, FIG. 15 shows a modified example of the embodiment of FIG. 13; this embodiment is one in which a valve 5 is fitted into an ventilation hole 4b of a cylinder 4 closed in the middle of the cylinder 4, and further a concave portion 4e is formed to a lower portion of the cylinder portion 4c of the cylinder 4, and a through-hole 6c is formed to side surfaces of the concave portion 4e.

Figure 16:
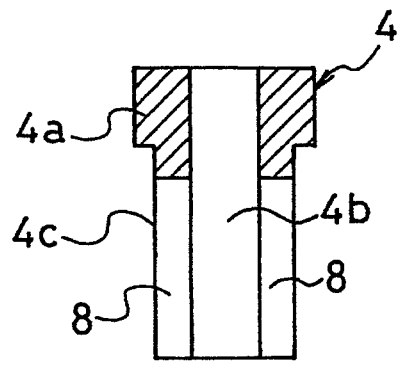
FIG. 16 is a sectional view showing a cylinder provided with a slot as the cylinder constituting the plug body according to the present invention.
Figure 17:
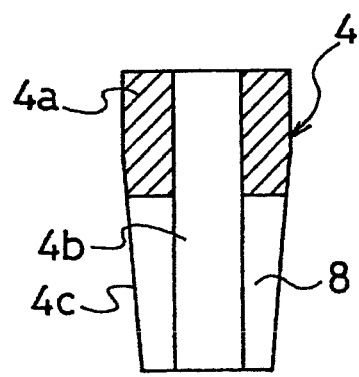
FIG. 17 is a sectional view showing another cylinder provided with a slot as the cylinder constituting the plug body according to the present invention.

A cylinder 4 of FIG. 16 is a modified example of the cylinder 4 of FIG. 10. Slot portions 8 are formed to a cylinder portion 4c. Further, a cylinder 4 of FIG. 17 is a modified example of the cylinder 4 of FIG. 11. Slot portions 8 are formed to a cylinder 4c formed into a taper shape.

Figure 18:
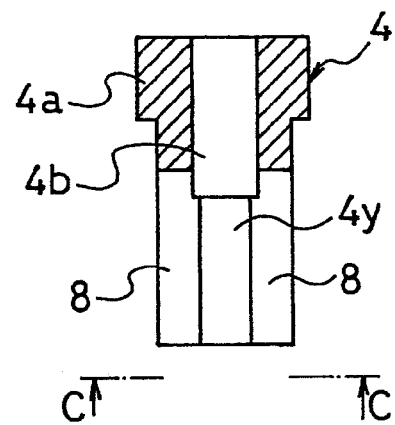
FIG. 18 is a sectional view showing a further cylinder provided with a slot as the cylinder constituting the plug body according to the present invention.
Figure 19:
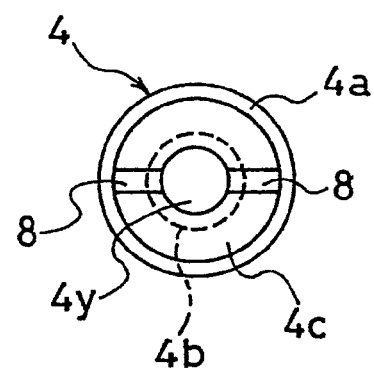
FIG. 19 is a bottom view viewed from an arrow C-C of the cylinder shown in FIG. 18.
Figure 20:
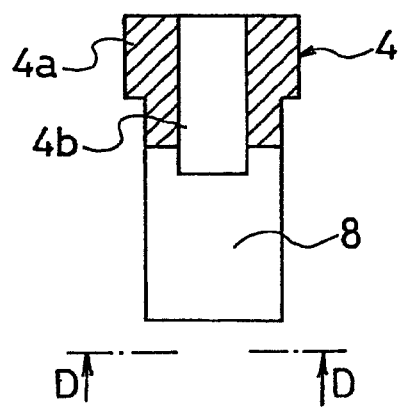
FIG. 20 is a sectional view showing a still further cylinder provided with a slot as the cylinder constituting the plug body according to the present invention.
Figure 21:
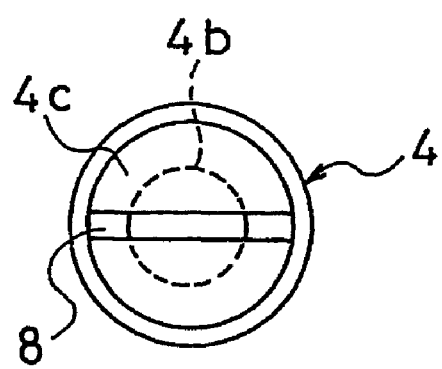
FIG. 21 is a bottom view viewed from an arrow D-D of the cylinder shown in FIG. 20.

FIGS. 18 and 19 each show a modified example of FIG. 12. The part from the through-hole 6 to the ventilation hole 4y portion of the cylinder 4 of FIG. 12 is formed into slot portions 8. FIGS. 20 and 21 each show a modified example of FIG. 13. A slot portion 8 is formed to the closed portion in the middle of the ventilation hole 4b.

Note that, two slot portions are formed at two positions with 180 degree symmetric of the cylinder portion 4c of the cylinder 4, but the number of the slot portions is not limited to this embodiment; it is also possible to form more than two positions.

Next, FIGS. 6 to 9 show respective embodiments in which the cylinder 4 of various embodiments such as those described above is each fitted into a vent hole 2 of a metal mold 1. A sectional view shows the embodiment of FIG. 6 in which the cylinder 4 shown in FIG. 13 is fitted into the vent hole 2 of the metal mold 1. In the embodiment, air Q flown in through the upper portion of the interstice 7 between the cylinder 4 and the valve 5 flows out to the vent hole 2 through the through-hole 6, and is discharged to the outside of the metal mold 1 through this vent hole 2. The valve 5 remains stationary due to bearing surface 4x (FIG. 12).

Figure 7:
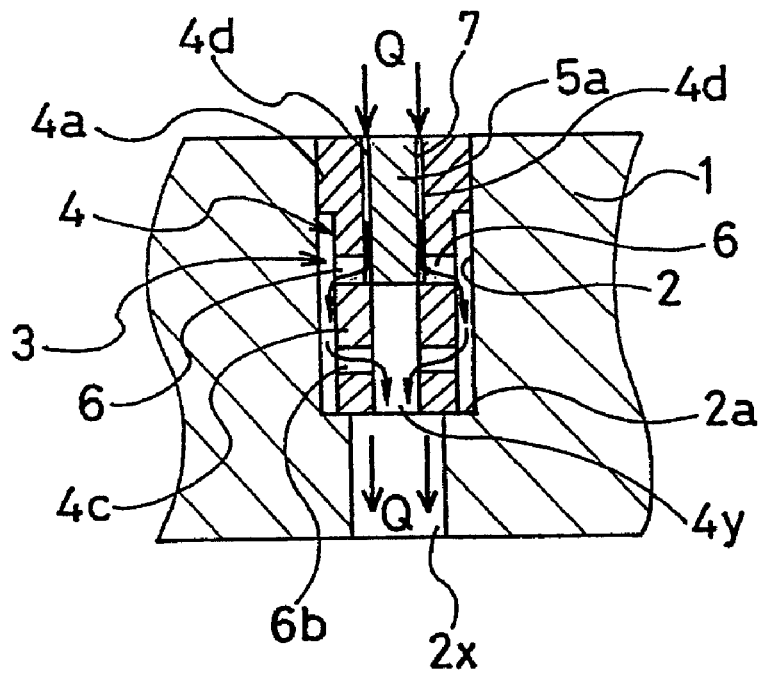
FIG. 7 is a sectional view showing an air venting state where a plug body of another embodiment is being fitted into a vent hole of the metal mold for tire formation according to the present invention.

Further, a sectional view shows the embodiment of FIG. 7 in which the cylinder 4 shown in FIG. 14 is fitted into the vent hole 2 provided with the fastening bearing surface 2a of the cylinder 4 in the metal mold 1. In this embodiment, air Q flown in through the upper portion of an interstice 7 between the cylinder 4 and a valve 5, first, flows out to the vent hole 2 through a through-hole 6, and then, flows in the ventilation hole 4y having a small diameter through the through-hole 6b of the cylinder portion 4c formed below the through-hole 6. The air Q then flows through the ventilation hole 4y, flows out to the small-diameter vent hole 2x, and is discharged to the outside of the metal mold 1.

Figure 8:
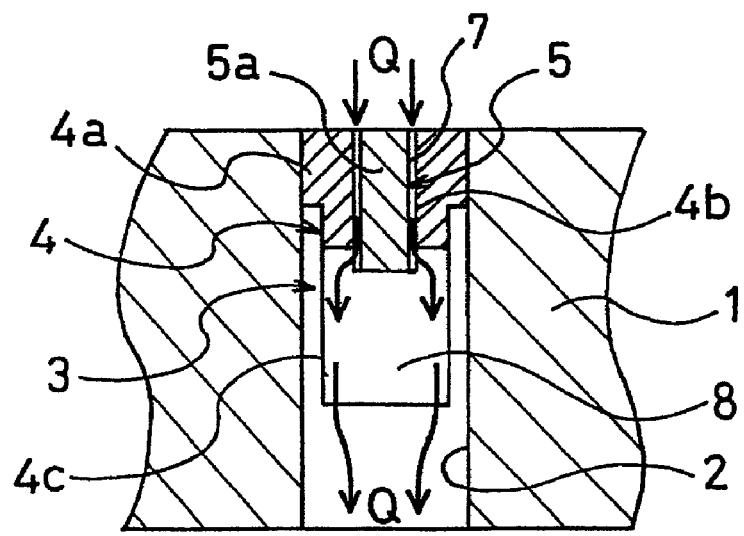
FIG. 8 is a sectional view showing an air venting state where a plug body of another embodiment is being fitted into a vent hole of the metal mold for tire formation according to the present invention.

Further, a sectional view shows the embodiment of FIG. 8 in which a cylinder 4 where the slot portion 8 is formed in the cylinder portion 4c shown in FIG. 16 is fitted into a vent hole 2. In this embodiment, air Q flown in through the upper portion of interstice 7 between the cylinder 4 and a valve 5 flows out to the vent hole 2 through the slot portion 8, and is discharged to the outside of the metal mold 1.

Figure 9:
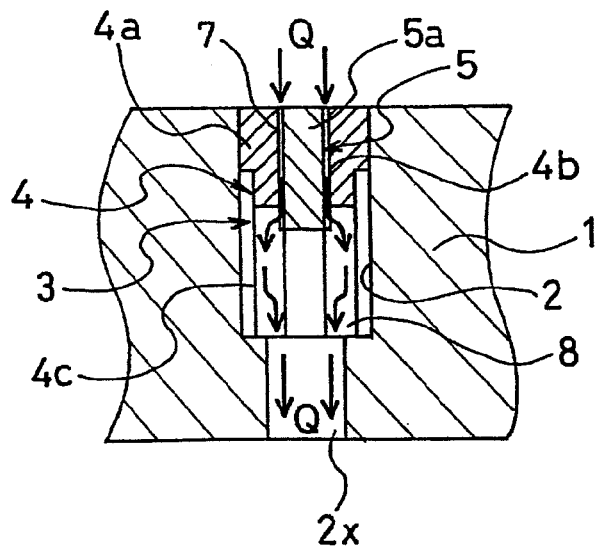
FIG. 9 is a sectional view showing an air venting state where a plug body of a further embodiment is being fitted into the vent hole of the metal mold for tire formation according to the present invention.

Further, a sectional view shows the embodiment of FIG. 9 in which a cylinder 4 where the slot portions 8 shown in FIGS. 18 and 19 are formed is fitted into the vent hole 2 of the metal mold 1. In this embodiment, air Q flown in through an upper portion of a interstice 7 between the cylinder 4 and a valve 5 flows out to the vent hole 2 through the slot portions 8, flows through the small-diameter vent hole 2x, and is discharged to the outside of this metal mold 1.

With the configuration as described above, the durability of the device can be enhanced because the ventilation distance of the air Q is shortened compared to the conventional device.

Moreover, the plug body 3 can be securely retained and fitted so that the plug body 3 can be stably embedded.

Further, when a tire W is formed using the metal mold 1 in each of which plug bodies 3 are fitted into a number of the vent holes 2 as described above, the air or gas Q between the metal mold 1 and the tire W is discharged to the outside of the metal mold 1 through the slot portion 8 continuous to the ventilation holes 4a and 4b of the cylinder 4 because the vent holes 2 are open before the tire is inserted into the metal mold 1.

Figure 22:
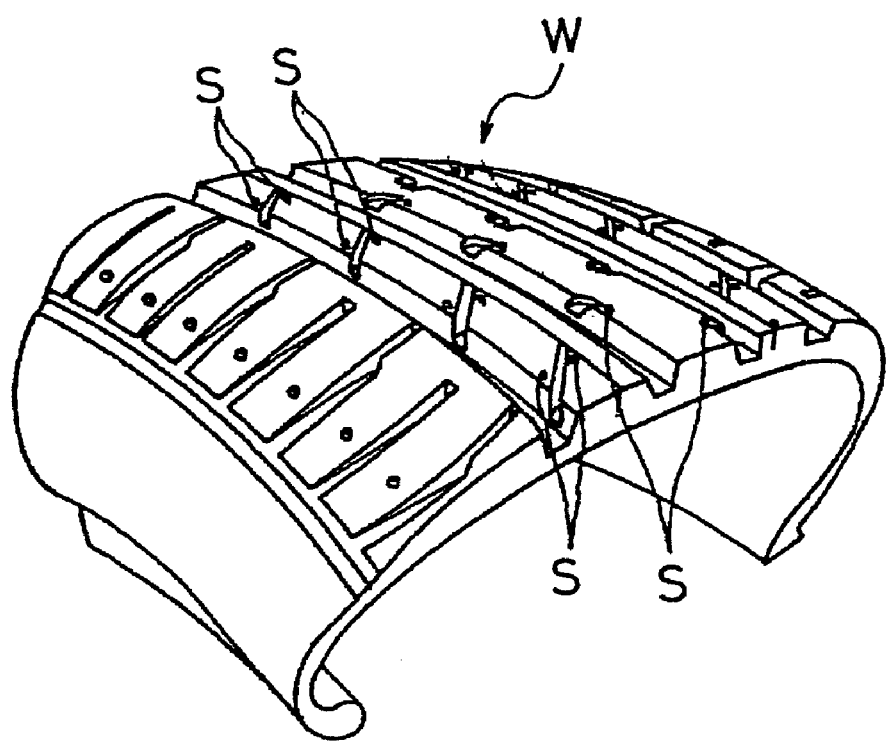
FIG. 22 is a partial perspective view of a tire manufactured using the metal mold for tire formation into which the plug body is fitted according to the present invention.

Moreover, after the tire is inserted, the air or gas Q is vented into the ventilation hole 4b of the cylinder 4 as described above, and vulcanized rubber in a melting state during tire vulcanization does not flow in the vent holes 2 since the interstice 7 having a size of less than 0.1 mm, which do not allow the rubber to flow in, are formed. Therefore, spews are not generated and the tire W with favorable appearance can be manufactured with only fine traces S as shown in FIG. 22.

Note that, a number of vent holes 2 formed in the metal mold 1 may be each placed between sipes, or at the center of blocks. In any case, it is possible to manufacture a tire with favorable appearance without spews conventionally generated.

What is claimed is:

1. A metal mold for tire formation in which a number of vent holes are provided to vent air or gas built-up between the metal mold and a tire during tire vulcanization, comprising:
   a plug having a cylindrical head portion and a cylindrical body portion detachably fitted into each of the vent holes;
   the diameter of the head portion being larger than the diameter of the body portion;
   an axial cylindrical ventilation hole formed through the head portion and through at least part of the body portion;
   a valve located in the axial cylindrical ventilation hole and forming a predetermined interstice with the plug; and
   a through-hole formed in a side face of the body portion which communicates with the interstice,
   wherein the valve is of an axial length equal to the axial length of the axial cylindrical ventilation hole.

2. The metal mold for tire formation according to claim 1, where t denotes the size of the interstice between the head portion and the valve, L1 denotes the outer diameter of the head portion, and L2 denotes the outer diameter of the body portion, t, L1, and L2 are set to be such that $(L1-L2)/2>t$.

3. The metal mold for tire formation according to claim 1, where a plurality of through-holes communicating with the axial cylindrical ventilation hole are formed in the side face of the body portion.

4. The metal mold for tire formation according to claim 1, where the body portion has a base opposite the head portion; and
   the through hole extends to the base of the body portion, forming a slot.

5. A plug which is used in a vent hole of a metal mold for tire formation, and which is detachably fitted into a vent hole of a metal mold for tire formation, the plug comprising:
   a cylindrical head portion and a cylindrical body portion detachably fitted into the vent hole;
   the diameter of the head portion being larger than the diameter of the body portion;
   an axial cylindrical ventilation hole formed through the head portion and through at least part of the body portion;
   a valve located in the axial cylindrical ventilation hole and forming a predetermined interstice interposed within the plug; and
   a through-hole formed in a side face of the body portion which communicates with the interstice,
   where the body portion has a base opposite the head portion,
   where a bearing surface with which the valve comes into contact is formed on the body portion between the through hole and the base of the body portion,
   where the bearing surface extends transverse to the extension direction of the axial cylindrical ventilation hole, and
   where the bearing surface faces towards the head portion, such that when the valve contacts the bearing surface, further movement of the valve towards the base of the body portion is prevented.

6. The plug which is used in the vent hole of the metal mold for tire formation according to claim 5, where t denotes the size of the interstice between the head portion and the valve, L1 denotes the outer diameter of the head portion, and L2 denotes the outer diameter of the body portion, t, L1, and L2 are set to be such that $(L1-L2)/2>t$.

7. The plug, which is used in the vent hole of the metal mold for tire formation, according to claim 5, where the body portion is closed at the base of the body portion.

* * * * *